US008881507B2

(12) United States Patent
Yan et al.

(10) Patent No.: US 8,881,507 B2
(45) Date of Patent: Nov. 11, 2014

(54) AIR DRIVEN REDUCTANT DELIVERY SYSTEM

(76) Inventors: Mi Yan, Columbus, IN (US); Baohua Qi, Columbus, IN (US)

( * ) Notice: Subject to any disclaimer, the term of this patent is extended or adjusted under 35 U.S.C. 154(b) by 141 days.

(21) Appl. No.: 13/592,091

(22) Filed: Aug. 22, 2012

(65) Prior Publication Data

US 2014/0053537 A1  Feb. 27, 2014

Related U.S. Application Data

(60) Provisional application No. 61/575,469, filed on Aug. 22, 2011.

(51) Int. Cl.
*F01B 3/00* (2006.01)

(52) U.S. Cl.
USPC .......... 60/286; 60/274; 60/276; 60/289; 60/295; 60/303

(58) Field of Classification Search
USPC .......... 60/274, 276, 286, 289, 293, 295, 301, 60/303
See application file for complete search history.

(56) References Cited

U.S. PATENT DOCUMENTS

| | | | | |
|---|---|---|---|---|
| 5,806,304 | A * | 9/1998 | Price et al. ................. | 60/274 |
| 6,273,120 | B1 * | 8/2001 | Hofmann et al. ............ | 137/98 |
| 6,293,097 | B1 * | 9/2001 | Wu et al. .................... | 60/286 |
| 6,845,611 | B2 | 1/2005 | Huthwohl et al. | |
| 7,107,759 | B2 * | 9/2006 | Annoura et al. ............ | 60/283 |
| 7,393,187 | B2 | 7/2008 | Weigl | |
| 7,454,898 | B2 * | 11/2008 | Allgeier et al. ............. | 60/286 |
| 7,497,075 | B2 | 3/2009 | Ripper et al. | |
| 7,497,077 | B2 | 3/2009 | Dodge et al. | |
| 7,707,825 | B2 | 5/2010 | Dingle et al. | |
| 7,866,333 | B2 * | 1/2011 | Boe et al. ................... | 137/1 |
| 8,356,473 | B2 * | 1/2013 | Blomquist et al. ......... | 60/295 |
| 8,646,475 | B2 * | 2/2014 | Jochumsen et al. ........ | 137/98 |
| 2008/0202104 | A1 | 8/2008 | Ichikawa | |
| 2009/0301064 | A1 | 12/2009 | Maier et al. | |

FOREIGN PATENT DOCUMENTS

| | | | |
|---|---|---|---|
| FR | WO2008087153 A1 | 7/2008 | |
| FR | WO2009034174 A1 | 3/2009 | |
| FR | WO2009090101 A1 | 7/2009 | |

* cited by examiner

*Primary Examiner* — Binh Q Tran

(57) ABSTRACT

A dosing system for delivering reductant to an exhaust gas treatment system of an internal combustion engine using air driven hydraulic pumps for closed-loop controlling reductant pressure and a two-stage PWM control method for controlling dosing rate. Reductant residue in the dosing systems is purged by using compressed air after a dosing process completes, and when the air driven hydraulic pumps are positioned inside a reductant tank, dedicated heating means for the pumps is not necessary. The air driven hydraulic pumps can also use low pressure compressed air, and the closed-loop pressure control together with the two-stage PWM control allow dosing accuracy insensitive to pressure variations in compressed air. These new features enable the dosing system use a variety of compressed air sources, including an engine turbo.

18 Claims, 17 Drawing Sheets

AIR DRIVEN REDUCTANT DELIVERY SYSTEM

This present application claims priority from U.S. provisional application No. 61/575,469 having the same title as the present invention and filed on Aug. 22, 2011.

FIELD OF THE INVENTION

The present invention relates to an apparatus and method for delivering reductant into an exhaust gas treatment system of an internal combustion engine for removing regulated species in exhaust gas, and more specifically, to an apparatus and method using air driven hydraulic pump to deliver liquid reducing agents into an exhaust gas treatment system of an internal combustion engine.

BACKGROUND OF THE INVENTION

Environmentally harmful species in the exhaust gas emitted from an internal combustion engine, such as hydrocarbons (HC), carbon monoxide (CO), particulate matters (PM), and nitric oxides (NOx) are regulated species that need to be removed from the exhaust gas. In lean combustion engines, due to the existence of large amount oxygen excess, passive means without extra dosing agents, such as that using a three-way catalyst, normally are not able to effectively remove the oxidative specie NOx, as that in most of spark-ignition engines. To reduce NOx in lean combustion engines, a variety of active means with reducing agents (reductants) being dosed in exhaust gas are developed. In these technologies, normally the reductant is metered and injected into the exhaust gas, and the result mixture flows into a SCR (Selective Catalytic Reduction) catalyst, where the reductant selectively reacts with NOx generating non-poisonous species, such as nitrogen, carbon dioxide, and water.

A variety of reductants, such as ammonia (NH3), HC, and hydrogen (H2) can be used in SCR systems. Among them, ammonia SCR is used most broadly due to high conversion efficiency and wide temperature window. Ammonia can be dosed directly. However, due to safety concerns and difficulties in handling pure ammonia, normally urea solution is used in ammonia SCR systems. Urea can be thermally decomposed and hydrolyzed to ammonia in exhaust gas.

Typically, in a SCR control system, the required ammonia dosing rate is calculated in an ECU (Engine Control Unit) 150. Then according to the urea-to-ammonia ratio, the required urea flow rate is calculated and the dosing rate command is sent to a dosing system, where urea solution is metered and injected into exhaust gas. Generally, similar to fueling control, there are two methods in metering reductant. One method is using a metering pump, with which the reductant flow rate is precisely controlled by controlling the pumping rate. The other method is more like that used in a common rail fueling control system. In this method, a pressure is built up and maintained constant in a reductant rail or buffer, and reductant flow rate is controlled by adjusting the opening time of an injector, which is fluidly connected to the buffer, in a repeating control cycle.

Atomization of reductant is important to SCR conversion efficiency, especially in a urea SCR system, where dosed urea needs to be thermally decomposed and hydrolyzed to ammonia and the heat energy provided by exhaust gas is limited. In the first reductant metering method, though the control is simple, the reductant pressure is not controlled. Therefore, to have a good atomization, in addition to having a well-designed nozzle facilitating atomization, normally the reductant dosing needs to be mixed with an extra air supply providing a continuous air flow. The requirements of a continuous air flow and a precisely controlled metering pump limit the application of this method. The second reductant metering method doesn't need an extra air supply to facilitate atomization, since under high pressure, injected reductant from a well-designed nozzle has good atomization. However, in this method, due to the requirement of pressure control, typically a liquid pump, such as a membrane pump, driven by a motor, is needed in establishing and maintaining the rail pressure, and a complex motor control system is required.

Additionally, to avoid frozen reductant under low ambient temperature, reductant residue inside the dosing system need to be purged before the dosing system is shut off. In a system using the first reductant metering method, air supply can be used to push the reductant residue back to tank, while in that using the second method, an extra reductant flow control is needed to drive the reductant residue back. In dosing systems which have reductant residue in connection lines, line heating means are also required. Different from reductant tank heating control, line heating is a distributed heating and it is hard and costly to use closed-loop controls. Except using special PTC (Positive Temperature Coefficient) heaters, heating power and line durability need to be carefully balanced to avoid damage caused by locally over-heating.

For decreasing the complexity of a reductant dosing system while at the same time achieving good performance, a primary object of the present invention is to provide a reductant dosing apparatus using air driven hydraulic pumps with a simple pressure control to build up and maintain a high pressure in a rail. The air driven hydraulic pump doesn't have a motor inside and, therefore, doesn't need electrical energy and a complex motor control to drive it. Neither the air driven hydraulic pump needs a continuous air supply.

A further object of the present invention is to provide a method controlling dosing rate insensitive to variations in reductant pressure, so that accurate dosing rate is obtained under varying reductant pressure.

Another object of the present invention is to provide a dosing apparatus with an air driven hydraulic pump using compressed air generated from an engine turbo, so that no extra air source is required.

Yet another object of the present invention is to provide a control means using compressed air to drain reductant residue back to tank when a dosing process completes.

Yet another object of the present invention is to provide a dosing apparatus with an air driven hydraulic pump positioned inside a reductant tank, thereby no extra heating means other than tank heating is needed for the pump.

BRIEF SUMMARY OF THE INVENTION

The present invention provides an apparatus and method for delivering reductant into an exhaust gas treatment system of an internal combustion engine. More specifically, this apparatus includes a reductant supply module with an air driven hydraulic pump and a hydraulic buffer, a pressure sensor, a reductant tank, a dosing control unit (DCU), and an injector. In an embodiment of the present invention, a pressure sensor is positioned in a hydraulic buffer to measure the pressure of reductant supplied by an air driven hydraulic pump, which has an inlet port fluidly coupled to a compressed air source through a solenoid valve and an outlet port fluidly coupled to ambient through another solenoid valve and an optional muffler. The air driven hydraulic pump has a pressing stroke and a suction stroke. The strokes and the pressure in the air driven hydraulic pump are controlled by a DCU through operating the solenoid valves to feed and release air. In the pressing stroke, the reductant pressure in the hydraulic buffer is controlled by a feedback controller in the DCU using sensing values obtained from the pressure sensor, while in the suction stroke, the pressure feedback controller is disabled and the reductant pressure is maintained by the hydraulic buffer. The hydraulic buffer is fluidly connected to an injector for reductant dosing, and the inlet of the injector is coupled to the reductant tank through a shut-off valve. After dosing, the shut-off valve opens. The reductant residue in the air driven hydraulic pump and the hydraulic buffer is drained under pressure in the pump, and that in the injector is purged. The reductant dosing rate is controlled with a PWM controller, which generates a PWM signal to drive the injector according to dosing commands. The PWM controller has two stages. The first stage controller creates a first stage PWM signal by periodically setting control parameters to the second stage controller generating a second stage PWM signal. The values of the control parameters are calculated by the first stage controller according to the sensing values obtained from the pressure sensor positioned inside the hydraulic buffer. In this way, variations in the pressure are compensated by the PWM controller, and the dosing rate accuracy, therefore, is insensitive to the pressure variations. The reductant temperature in the dosing system needs to be maintained above its freezing point to allow dosing under low ambient temperature. In the embodiment of the present invention, with the reductant residue purged by compressed air after dosing, the air driven hydraulic pump can be positioned inside the reductant tank to save heating means for the pump.

The air driven hydraulic pump is able to work with a compressed air source with pressure lower than the reductant pressure in the hydraulic buffer. In another embodiment of the present invention, an air driven hydraulic pump has a piston inside it. The piston has two surfaces and separates the inner space of the pump into an upper air chamber and a bottom reductant chamber. The surface facing the upper air chamber has a larger area than that facing the bottom reductant chamber, and thereby a higher reductant pressure is obtained. A fluid passage fluidly connects the upper air chamber to the bottom reductant chamber when the piston moves to a position for draining reductant after dosing.

To avoid possible pressure drop in a suction stroke, in another embodiment of the present invention, two air driven hydraulic pumps are used to provide continuous pressure feedback control. The two pumps are controlled working alternately, i.e., when the first pump is in pressing stroke with pressure feedback control, a suction stroke is triggered for the second one, and the second pump goes into pressing stroke when the first one needs to refill with a suction stroke. In this way, at any time, there is a pump in pressing stroke with pressure feedback control, and thereby, reductant pressure in the hydraulic buffer is always controlled constant.

The closed-loop pressure control and the two-stage PWM control allow the reductant pressure insensitive to pressure variations in the compressed air supply, and the air driven hydraulic pump is able to work with a compressed air pressure lower than the reductant pressure. Furthermore, due to the nature of air driven hydraulic pump, the air consumption is the same as reductant dosing amount, and no continuous air flow is needed. These new features enable the dosing system in the present invention use a variety of compressed air sources, including an engine turbo.

BRIEF DESCRIPTION OF THE DRAWINGS

FIG. 2b is a flow chart of a stroke control algorithm for controlling the air driven hydraulic pump system of FIG. 2a;

FIG. 2c is a flow chart of a pressure control algorithm used in controlling the air driven hydraulic pump system of FIG. 2a;

FIG. 5b is a block diagram with signal flow chart of the PWM control block in the PWM controller of FIG. 5a;

DETAILED DESCRIPTION OF THE INVENTION

Reductant Delivery System

Figure 1:
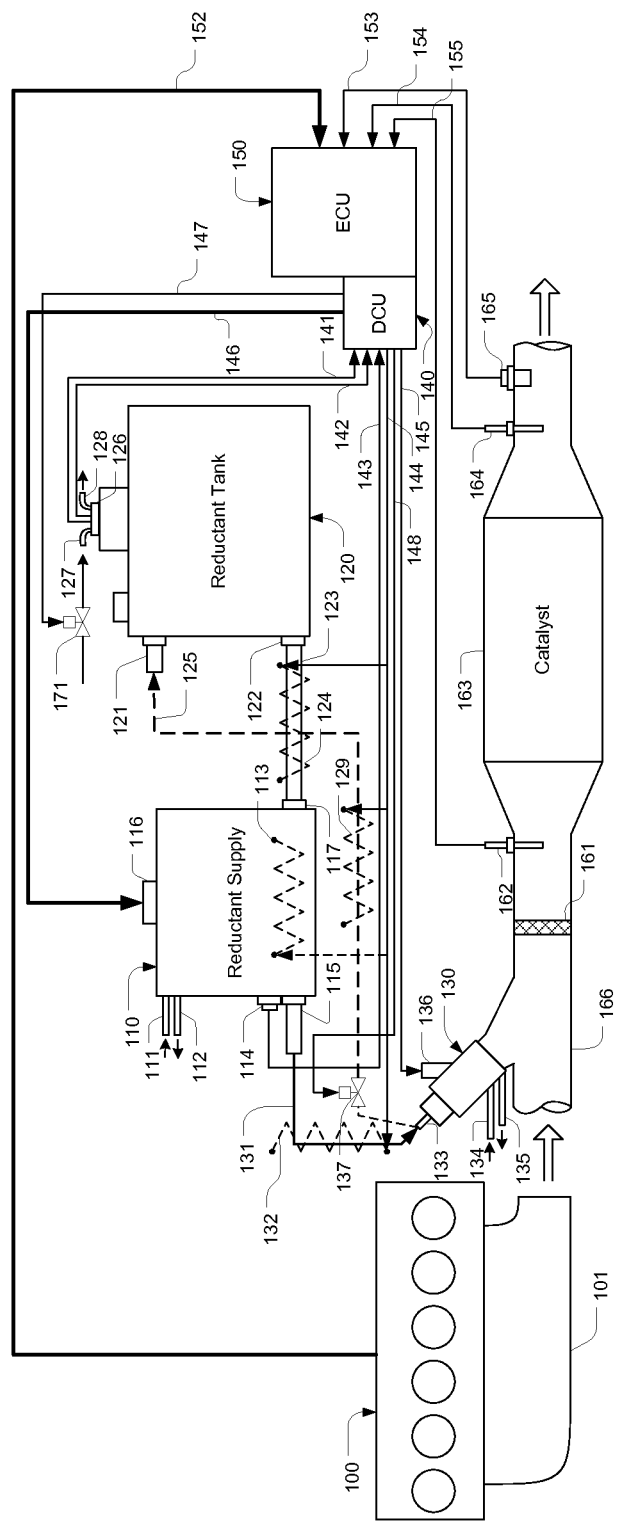
FIG. 1 is a schematic representation of an internal combustion engine with an exhaust gas treatment system.

Referring to FIG. 1, in an engine aftertreatment system, exhaust gas generated by an engine 100 enters a passage 166 through a manifold 101. On the passage 166, a reductant injector 130 is installed. The solenoid valve of the injector 130 is controlled by a Dosing Control Unit (DCU) 140 through a signal line 145 connected to a port 136. And reductant is provided by a reductant supply module 110 through a pressure line 131 fluidly connected to a port 133. To avoid damages caused by high temperature exhaust gas, engine coolant is cycled from an inlet port 134 to an outlet port 135. The reductant injected from the injector 130 mixes with exhaust gas, and through a mixer 161, the result gas enters a catalyst 163, where SCR reactions reduce NOx from the exhaust gas.

The reductant supply module 110 has a port 115 fluidly connected to the port 133 of the injector 130 with the line 131 for providing pressurized reductant supply to the injector. A pressure sensor (not shown in FIG. 1) reports pressure value inside the reductant supply module to the DCU through a line 143 connected to a port 114. The reductant supply module draws reductant from a reductant tank 120 through a port 117, a supply line 123, and a port 122 of the reductant tank. And compressed air enters reductant supply module through an inlet port 111 to pressurize the reductant inside, while the reductant pressure is controlled by the DCU through lines 146 connected to a port 116. Compressed air is released from an outlet port 112.

A tank level sensor and a temperature sensor report, respectively, the reductant level and temperature inside the reductant tank 120 to the DCU through lines 141 and 142, which are connected to a port 126. And the reductant tank is heated by engine coolant cycling through an inlet port 127 and an outlet port 128. The engine coolant flow is controlled by a solenoid shutoff valve 171 commanded by the DCU through a line 147. To avoid reductant residue inside the pressure line 131 being frozen under low temperature when engine is off, a return line 125, and a port 121 are used as a passage for reductant to flow back to the tank in a purge process. Reductant flow inside the return line 125 is controlled by a shut-off valve 137 commanded by the DCU via a line 148. Electrical heaters 132, 129, 124 and 113 commanded by the DCU through lines 144 are used to thaw frozen reductant in the pressure line 131, the return line 125, the supply line 123, and the reductant supply module 110, and keep the temperature above reductant freezing point.

Commands of reductant dosing rate to the DCU is generated in the ECU according to catalyst inlet exhaust temperature reported by a sensor 162 through a line 155, catalyst outlet temperature reported by a sensor 164 through a line 154, catalyst outlet NOx concentration obtained from a sensor 165 through a communication line 153, and engine information, such as engine state, coolant and oil temperature, engine speed, fueling rate, exhaust flow rate, NOx concentration, and NO2/NOx ratio, obtained from sensors in the engine 100 through lines 152, or calculated using the sensing values obtained from the sensors.

Air Driven Hydraulic Pump

Figure 2A:
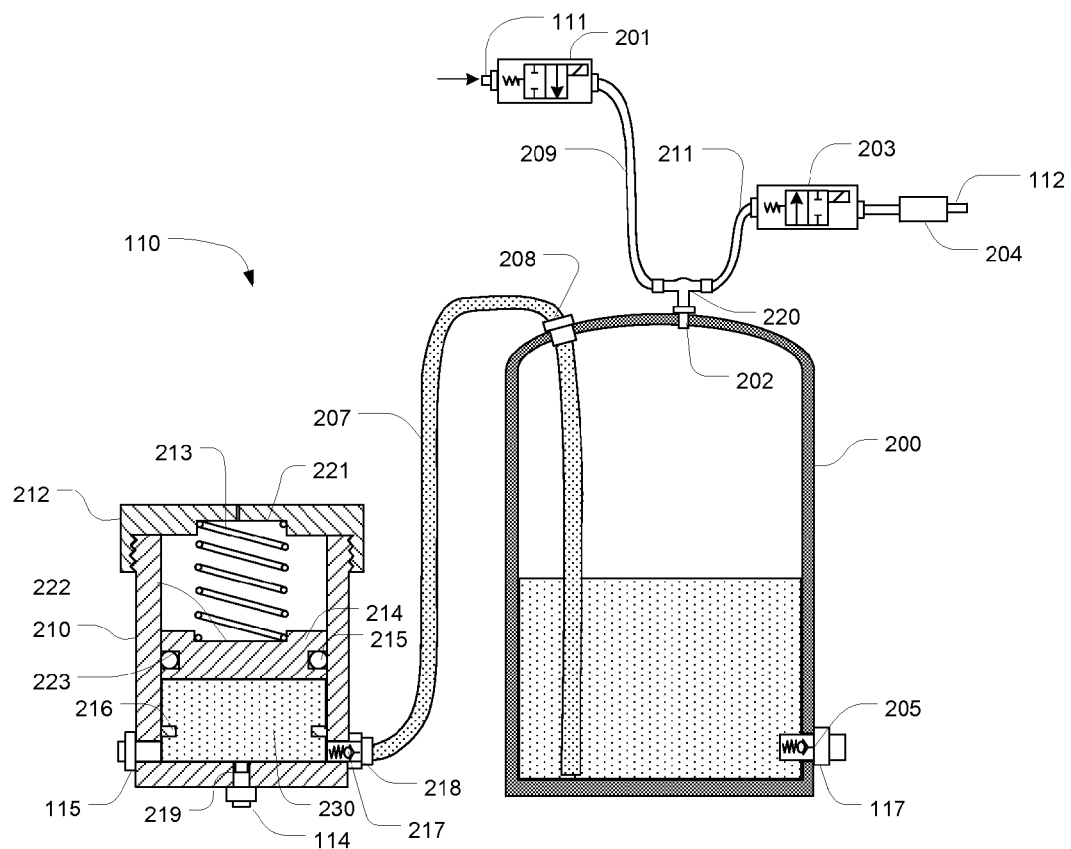
FIG. 2a depicts an air driven hydraulic pump system with a hydraulic buffer and control solenoid valves.

One embodiment of the reductant supply module 110 in FIG. 1 is an air driven pumping system depicted in FIG. 2a. In the pumping system, a pump body 200 holds reductant provided from the reductant tank 120 through the port 117 and a check valve 205, which prevents reductant from flowing back to the tank. On top of the pump body 200, a port 202 connected to a T connector 220 is used to pass compressed air in and out. One side of the T connector 220 is connected through a line 209 to the outlet of a normally-closed solenoid valve 201, the inlet of which is the port 111 (FIG. 1) connected to a compressed air source. The other side of the T connector is connected to the inlet of a normally-open solenoid valve 203 through a line 211, and a muffler 204 is mounted to the outlet of the solenoid valve 203 to decrease air releasing noise. The outlet of the muffler is the port 112 (FIG. 1). Under the pressure inside the pump body, reductant is pressed into a hydraulic buffer body 210 through a port 208, a line 207, a port 218, and a check valve 217, which prevents reductant from flowing back to the pump body. A cap 212 is screwed on the hydraulic buffer body 210, and a spring 213 is positioned in between a groove 221 in the cap 212 and another one 222 in a piston 214, the bottommost position of which is limited by a restrainer 216. With the piston 214 and the hydraulic buffer body 210, a high pressure chamber 230 is enclosed, and an o-rang 215 in a groove 223 of the piston 214 seals reductant in the high pressure chamber 230 from leaking out. Upon the injector 130 being energized, reductant inside the chamber 230 flows out through the port 115, while the pressure in the chamber 230 is monitored by a pressure sensor 219 and the pressure sensing values are sent to the DCU through the port 114.

Reductant inside the pump body 200 needs to be refilled periodically, and the pump pressure is controlled constant after refill. Normally, a refill action of the pumping system is called a suction stroke, and a pumping action a pressing stroke. Both of stroke control and pressure control of the pumping system are accomplished using the combination of controls to the solenoid valves 201 and 203. The controls to the two valves have four modes shown in the following table.

TABLE 1

| Mode number | Status of the valve 201 | Status of the valve 203 | Actions |
| --- | --- | --- | --- |
| 0 | Not energized | Not energized | Releasing air from pump |
| 1 | Not energized | Energized | Keeping air in pump |
| 2 | Energized | Not energized | Releasing compressed air |
| 3 | Energized | Energized | Filling air to pump |

In Mode 0, both of the solenoid valves 201 and 203 are not energized, and the pump releases air to ambient. In Mode 1, since the solenoid valve 201 is energized, the pump is disconnected from ambient. At the same time, the solenoid valve 203 is not energized, therefore, in this mode, the air is stuck in the pump. Mode 2 is a special mode. In this mode, the compressed air is released into ambient. Mode 2 can be used with a Venturi T connector 220 to create a low pressure in the pump body facilitating refill in a suction stroke, however, in a pressing stroke, Mode 2 should be avoided. Mode 3 is an aspiration mode. In this mode, the solenoid valve 201 disconnects the pump from ambient, while the solenoid valve 203 connects the pump to the compressed air supply.

Figure 2B:
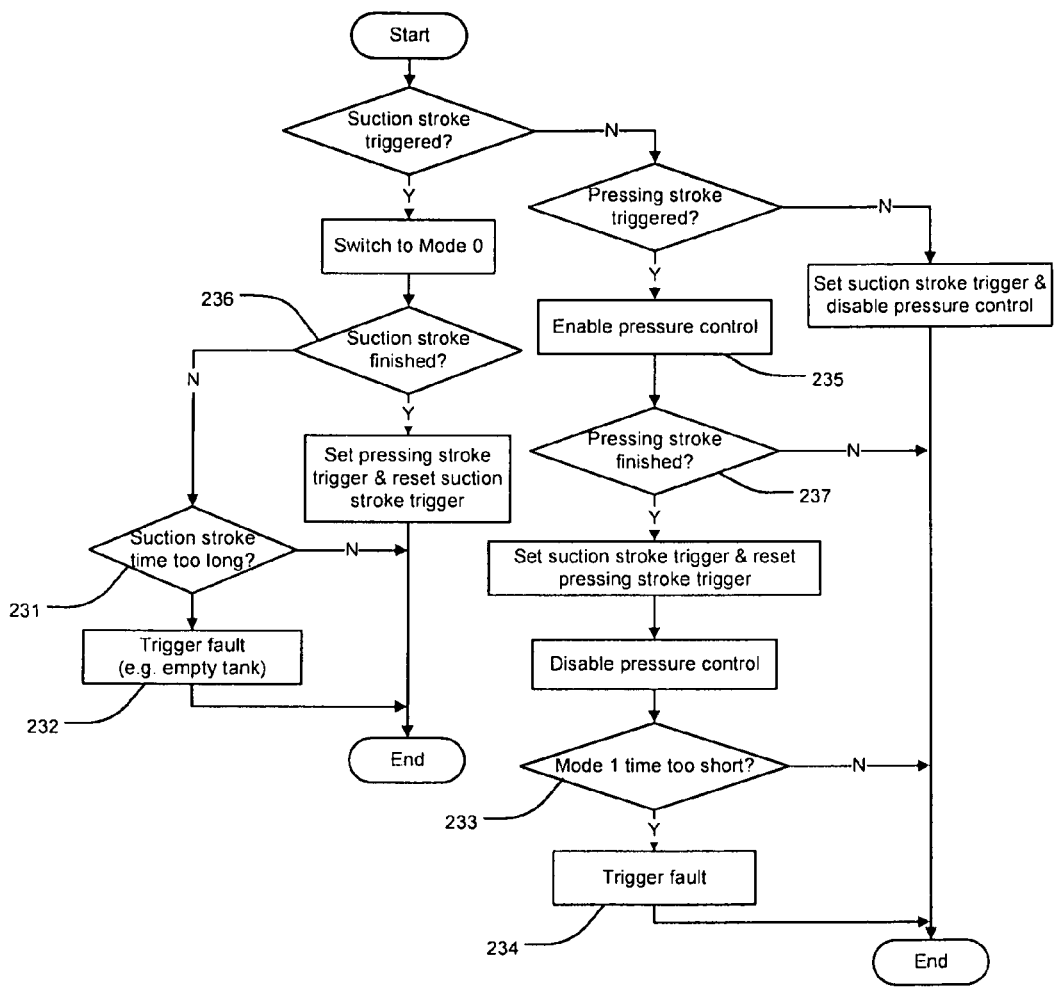

The suction stroke and pressing stroke are triggered alternately in a pump control, and the pump control can be realized using a service routine running periodically for a timer based interrupt. Referring to FIG. 2b, in an exemplary pump control routine, a suction stroke trigger state is examined first. If a suction stroke is triggered, then the pump control goes to Mode 0, in which the pump releases air to ambient and after the air pressure inside the pump body drops, under gravity or the pressure difference between the reductant tank and the pump body, fluid flows into the pump. In the suction stroke, no fluid flows out of the pump, and the reductant driving pressure is maintained by the hydraulic buffer. After the pump control being set to mode 0, a suction stroke running status is checked in a step 236. If the suction stroke is completed, then before the routine ends, the pump control reset the suction stroke trigger and sets pressing stroke trigger to start a pressing stroke in the next cycle. Otherwise, the suction stroke time is examined in a step 231, if it is too long, then a fault is reported in a step 232 and the routine ends. Referring back to the examination of the suctions stroke trigger state, if a suction stroke is not triggered, then a pressing stroke trigger state is checked. If a pressing stroke is not triggered, then the suction stroke trigger is set and the pressure control is disabled before the routine ends, otherwise, in a step 235, the pressure control is enabled to keep the hydraulic buffer pressure to a constant level commanded by the DCU. A pressing stroke running status is examined in a step 237 after the step 235. If the pressing stroke is not complete, then the routine ends. Otherwise, the pressing stroke trigger is reset and the suction stroke trigger is set. The pressure control is disabled thereafter, and the time of Mode 1 in pump control is examined in a step 233. A fault is reported in a step 234 if the Mode 1 time is too short.

Figure 2C:
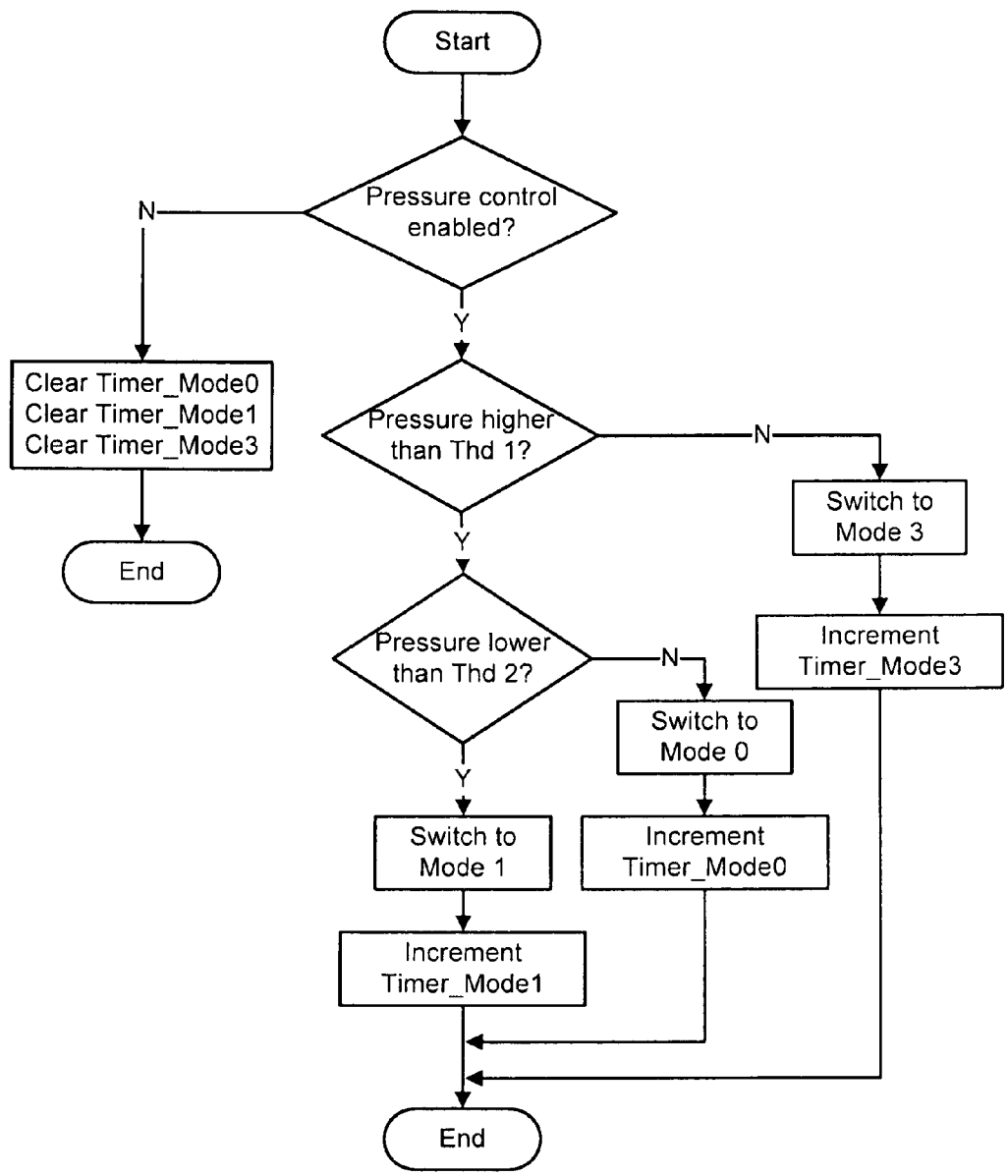

According to the ideal gas law, the hydraulic buffer pressure is determined by the amount of compressed air trapped in the pump body at a given temperature and volume, therefore, this pressure can be controlled by adjusting the amount of trapped compressed air with the solenoid valves 201 and 203. An embodiment of the pressure control mentioned in the step 235 of FIG. 2b is a service routine running periodically for a timer based interrupt, as shown in FIG. 2c. In this routine, a pressure control state is checked first. If a pressure control is not enabled, then all three mode timers, Timer_Mode0, Timer_Mode1, and Timer_Mode3, are cleared and the routine ends. Otherwise, the pressure sensing value obtained from the sensor 219 (FIG. 2*a*) is examined. If the pressure value is above a threshold Th1 and below another threshold Th2, the controller switches to Mode 1, in which the compressed air is hold within the pump body, and the timer Timer_Mode1 is incremented. If the pressure is not lower than the threshold Th2, then the controller goes into Mode 0 to release air and increments the timer Timer_Mode0, while if the pressure goes below or equals to the threshold Th1, the controller switches to the Mode 3 to fill air into the pump to increase air pressure and increments the Mode 3 timer Timer_Mode3. As mentioned above, Mode 2 should not be allowed in the pressure control. To keep the pump control momentarily going into Mode 2, in switching modes Mode 3 to Mode 0, the controller should de-energize the solenoid valve 201 first, while in changing modes back to Mode 3 from Mode 0, the controller should energize the solenoid valve 203 first.

In the pump control of FIG. 2*b*, a refill event and a pump full event can be used, respectively, in starting a suction stroke and a pressing stroke in the steps 236 and 237. A refill event is triggered by detecting reductant level in the pump body or using injection time to calculate reductant level. To detect reductant level in the pump, a level sensor needs to be installed inside the pump (not shown in FIG. 2*a*), while the accumulated flow amount, which is calculated using injection time and pressure or mass flow rate, can be used to determine the reductant level in the pump body. Similar to the refill event, the pump full event can be triggered by either detecting reductant level or calculating refill time, which is a function of reductant level in the tank, and the pressure difference between the reductant in the pump body and that in the reductant tank. Since in a suction stroke, reductant driving pressure is only provided by the hydraulic buffer and not controlled, suction stroke time should be kept short to avoid causing significant pressure drop.

When a level sensor is used in triggering refill and pump full events, if the reductant tank is empty, then a pump full event will not be triggered in a long time resulting in a long suction stroke Therefore, by detecting a failed pump full event, an empty liquid tank can be detected. The steps 231 and 232 in FIG. 2*b* show this detection. After a pressing stroke is triggered, if it is hard to establish the driving pressure, then there could be a pump issue, e.g. leaking, or a compressed air problem. Accordingly, overly long time of Mode 1 in a pressing stroke can be used for detecting these faults. The steps 233 and 234 in FIG. 2*b* show this detection.

When an engine is keyed off, reductant in the pump body, hydraulic buffer, and lines should be drained to avoid leakage or being frozen. In the dosing system shown in FIG. 1 and FIG. 2*a*, the draining of the reductant can be accomplished by using the shutoff valve 137 in Mode 1 of the pressure control, i.e., when the shutoff valve 137 is opened, reductant in the pump body, hydraulic buffer, and lines is pressed back to the reductant tank by the compressed air inside the pump body through the line 131 and the line 125. After purge, the compressed air trapped inside the pump body in Mode 1 is released to the reductant tank. The purge process may not be able to drain all residue trapped in the injector 130. To further clean up the injector, a Mode 3 can be triggered while the shutoff valve 137 is closed and the injector nozzle is energized to blow out the residue in the injector 130.

Figure 3A:
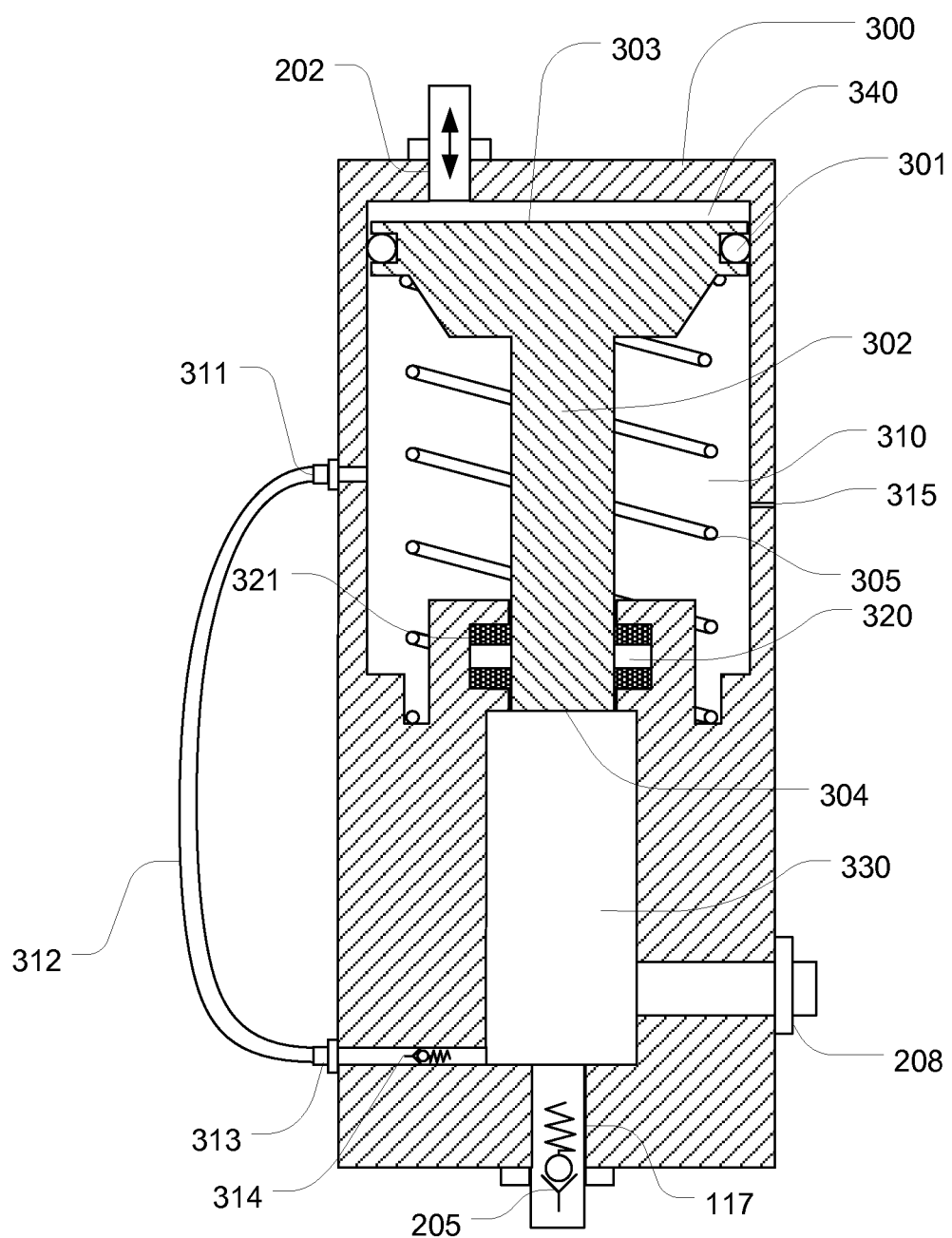
FIG. 3a is a diagrammatic and cross-sectional illustration of an air driven hydraulic pump system with a piston inside during normal dosing.

Driving pressure in the air driven hydraulic pumping system shown in FIG. 2*a* can only be controlled below that of the compressed air supply. In a reducant delivery system, however, a high driving pressure is needed for good atomization, which is important in obtaining high conversion efficiency and avoiding droplet impingement and deposit. To boost up driving pressure so that we can use a compressed air supply with low pressure, a pump with a piston inside as depicted in FIG. 3*a* can be used. Referring to FIG. 3*a*, inside a pump housing 300, a piston 302 has a large diameter surface 303 contacting compressed air. The other side of the piston 302 has a small diameter surface 304 contacting reductant. The piston 302 divides the pump housing 300 into three spaces: a compressed air space 340, a middle space 310, which form an air chamber, and a reductant chamber 330. The compressed air space 340 is sealed from the middle space 310 with an o-ring 301 on the piston 302, while the reductant chamber 330 is sealed from the middle space 310 using a seal 321 in bore 320. A spring 305 is used to support the piston 302. When a pressure Pc is applied in the compressed air space 340, with the force delivered by the piston 302, the driving pressure obtained in the reductant chamber 330 is Pl, and $$Pl=(Pc*A303-ks*x-f0)/A304 \qquad (1),$$

where A303 is the area of large diameter surface 303, ks is the spring constant of spring 305, x is the distance from the uppermost position of the piston 302 to the current position, f0 is the friction force plus the static spring force, and A304 is the area of small diameter surface 304. According to equation (1), if the spring constant ks and friction force is small, the ratio between the areas 303 and 304, A303/A304, determines the driving pressure.

In a pressing stroke, when compressed air establishes pressure in the space 340, the piston goes downward under the pressure, pressing the spring and generating driving pressure in the reductant chamber 330. In a suction stroke, when the compressed air is released, the piston goes upward under the force provided by the spring 305. Thereby reductant is pulled in the chamber 330 from the tank. Compared to the pump shown in FIG. 2*a*, in the pump of FIG. 3*a*, the suction stroke has a forced suction process.

The controls for the pump of FIG. 3*a* are the same as that for the pump of FIG. 2*a*. However, the driving pressure control range is different. For the pump of FIG. 2*a*, the driving pressure control range is from the opening pressure of the check valve 205, Pb205, to the compressed air pressure Pc, while for the pump of FIG. 3*a*, according to equation (1), the driving pressure range is from Pb205 to Pl(0), and Pl(0)=(Pc*A303−f0)/A304.

Figure 3B:
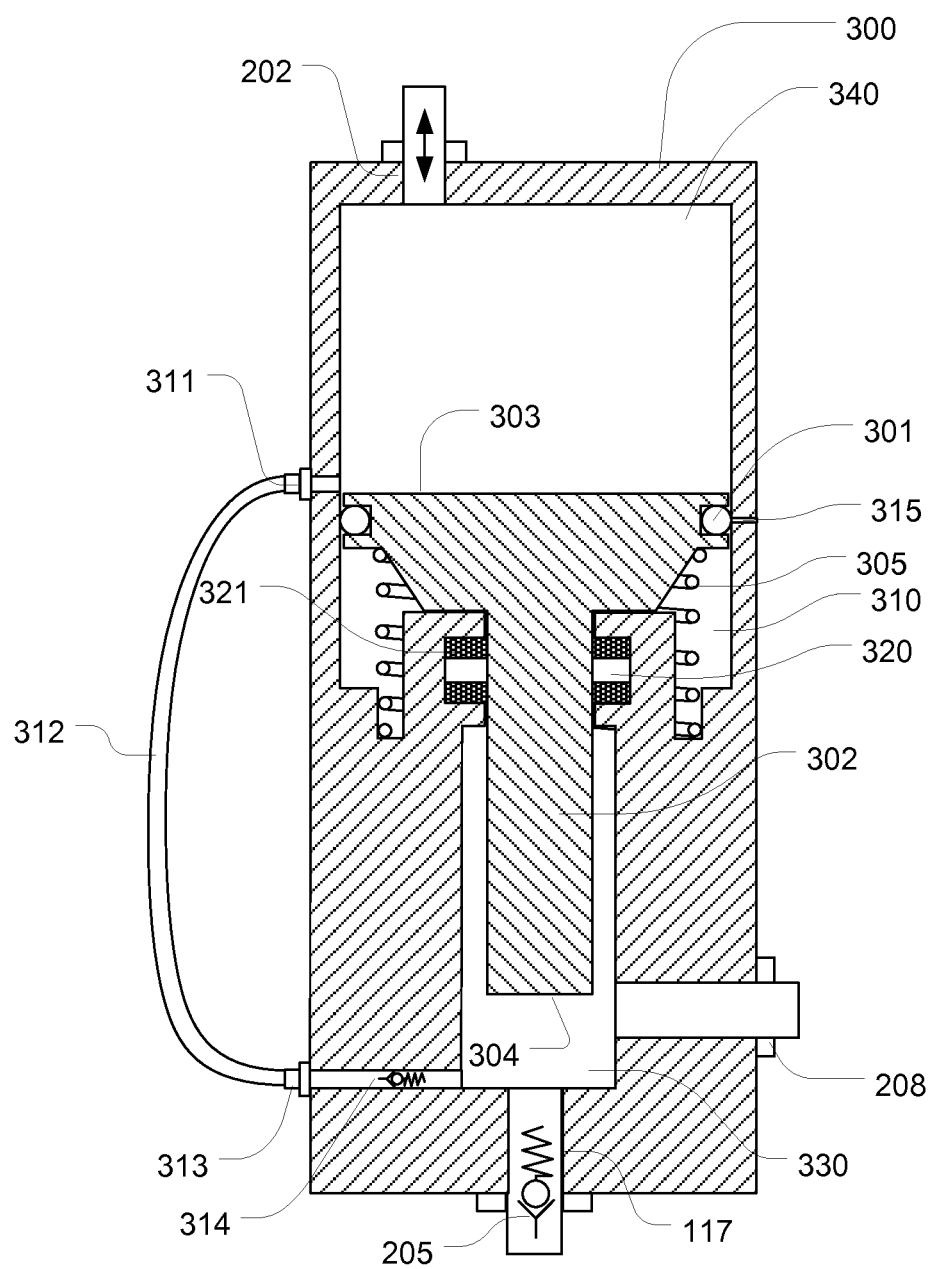
FIG. 3b is a diagrammatic and cross-sectional illustration of an air driven hydraulic pump system with a piston inside in reductant purging.

In addition to pumping reductant, the pump of FIG. 3*a* is also able to purge reductant residue after a dosing process completes. Referring to FIG. 3*a*, in the pump, the air chamber has a port 311 fluidly connected to a port 313 in the reductant chamber through a line 312, and a check valve 314 prevents reductant from flowing back to the air chamber. The air chamber also has another port 315 to release trapped compressed air to ambient. The ports 311 and 315 are fluidly connected to the space 310 except when the piston 302 moves to its bottommost position as shown in FIG. 3*b*. At the bottommost position, the port 311 is fluidly connected to the space 340. During normal operations, the pressure inside the reductant chamber 330 is always higher than that in the space 310. Therefore, blocked by the check valve 314, no flow exists in the line 312. When dosing completes, the shutoff valve 137 (FIG. 1) opens, and the DCU stops triggering suction stroke to refill the pump. Once the reductant in the pump depletes, the piston 302 moves to its bottommost position, connecting compressed air to the port 313 through the port 311 and the line 312. When reductant in the hydraulic buffer depletes, under the pressure of the compressed air, reductant residue in the pump, the hydraulic buffer will be pressed back to the tank through the line 125 (FIG. 1). After the purge process, a Mode 3 can be triggered while the shutoff valve 137 (FIG. 1) is closed and the injector nozzle is energized to blow out the residue in the injector 130 (FIG. 1).

Reductant Tank

Figure 4:
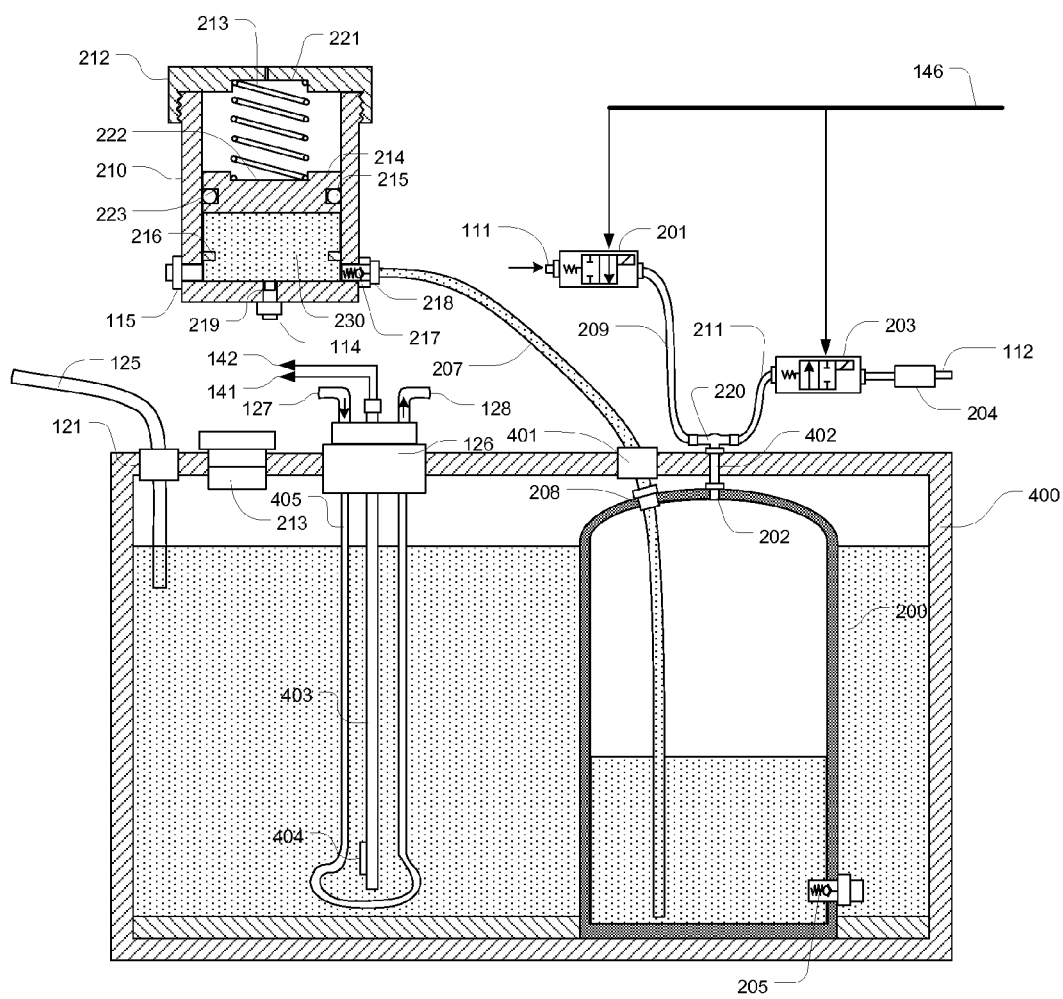
FIG. 4 depicts an air driven hydraulic pump positioned in a reductant tank.

After purge, the compressed air in the pump and the hydraulic buffer is released, and the hydraulic buffer is empty. However the reductant in the tank will enter the pump body under gravity and pressure difference, though the hydraulic buffer and reductant lines are still empty. Consequently, as shown in FIG. 1, the pump needs a heating apparatus (113) to thaw the reductant and maintain its temperature above freezing point under cold ambient conditions. The heating apparatus can be saved if the pump is positioned in the reductant tank, as depicted in FIG. 4. Referring to FIG. 4, the tank body 200 is enclosed by a reductant tank 400 with the reductant output line 207 connected to the hydraulic buffer through a port 401 and the compressed air port 202 connected to the T connector 220 through a port 402. A coolant heater 405 with the inlet 127 and the outlet 128 is used to heat the reductant when ambient temperature is low. Together with the coolant heater, a level sensor 403 is used to detect the reductant volume inside the tank and a temperature sensor 404 is used in monitoring and controlling the reductant temperature. The reductant level sensor 403 and temperature sensor 404 are connected to the DCU 140 through the line 141 and 142 respectively.

As mentioned above, in the pumping system of FIG. 2a and FIG. 3a, since after purge, the reductant residue in the pump, the hydraulic buffer, and lines are drained back to the tank, and the residue in the injector is blown out, thawing control for frozen reductant in the line 131 is not necessary and the heater 129 (FIG. 1) is not needed. In the system of FIG. 4, since the pump is positioned inside the tank, the line 123, the heater 124, and the heater 113 are saved. As a result, in this system, the only heating controls needed are a reductant tank heating control and a line maintenance heating control, which is used to keep the line 131 from being frozen during dosing. Thereby, the heating control is greatly simplified.

Two-Stage PWM Dosing Control

Reductant dosing rate in the system of FIG. 1 can be controlled by using a PWM signal to control the opening time of the injector 130 in a PWM cycle. With the PWM control, the reductant mass flow rate $\dot{m}_{af}$ is determined by the following equation:

$$\dot{m}_{af} = \int_0^{t_o} C_D A_n \sqrt{2\rho(P_r - P_c)} dt / S_0 \quad (2),$$

where $t_o$ is the PWM on-time, $P_r$ the pressure in the hydraulic buffer, $P_c$ the pressure in the exhaust passage 166, $S_o$ the PWM period, $C_D$ the discharge coefficient, $A_n$ the nozzle minimum area, and $\rho$ the working fluid density. The pressure $P_c$ is a function of exhaust volumetric flow rate and ambient pressure. However, due to the requirement of engine back-pressure, the pressure $P_c$ is limited to a small value compared the pressure $P_r$, which is normally higher than 4 bars. As a result, given a PWM control signal, the reductant mass flow rate is mainly affected by the pressure $P_r$ in the hydraulic buffer, which is measured by the pressure sensor 219 (FIG. 2a). Therefore, to make the reductant dosing accurate, we need either compensate the pressure variation in the hydraulic buffer in the PWM control, or eliminate pressure variation.

Figure 5A:
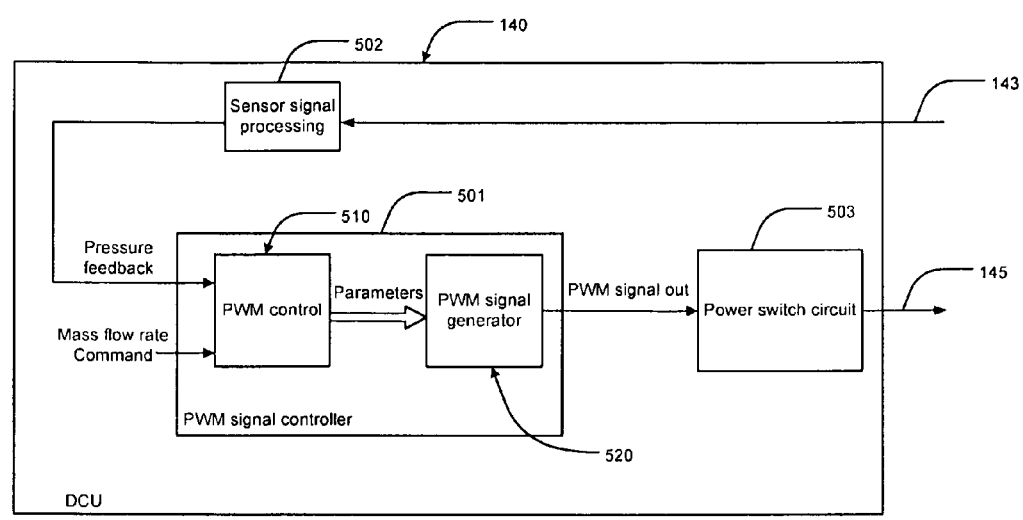
FIG. 5a is a block diagram with signal flow chart of a PWM controller for controlling reductant dosing rate.

A two-stage PWM control as shown in FIG. 5a can be used in compensating the pressure variation. In this control, through the line 143, the signal obtained from the pressure sensor (e.g. sensor 219 in FIG. 2) is sent to a sensor signal processing unit 502 in the DCU 140, where the analog pressure sensing signal is filtered and converted to digital signal. The result signal is fed into a PWM control module 510 in a PWM signal controller 501 together with a reductant mass flow rate command. The PWM control module then calculates the values for control parameters of a PWM signal generator 520. A PWM signal is generated by the PWM signal generator 520 and provided to a power switch circuit 503, where the PWM signal is converted to a switching signal driving the solenoid valve of the injector 130 (FIG. 1) through the control line 145.

The PWM signal creation in the PWM signal controller 501 includes two stages. In the first stage, the control parameters for the PWM signal generator 520 are set to generate a first stage PWM signal, which consists of second stage PWM signals created by the PWM signal generator 520 in the second stage signal generation. The first stage PWM signal generation has an execution rate matching with response rate of the pressure sensor, while the frequency of the second stage PWM signal is independent to the first stage one, and therefore, can be set high to increase control precision.

Figure 5B:
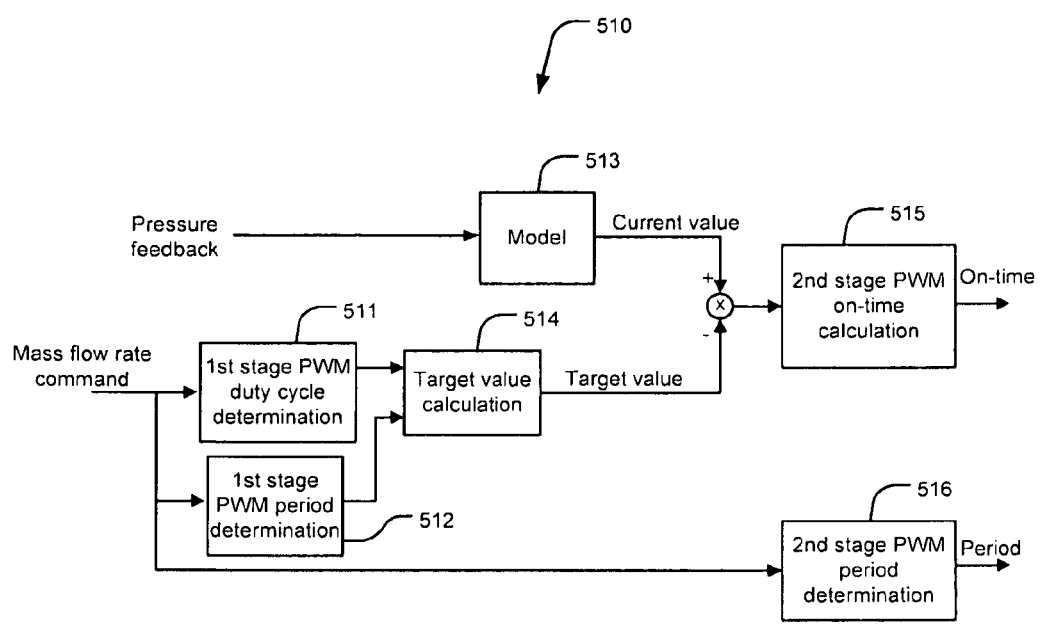

An embodiment of the PWM control module 510 is shown in FIG. 5b. In this module, upon receiving the mass flow rate command, in blocks 511 and 512, the duty cycle and period of the first stage PWM signal are calculated and provided to a block 514, where a target value is determined. The target value is then compared with a current value calculated in a block 513 with the pressure feedback value provided by the sensor signal processing unit 502 (FIG. 5a). The result error value is used by a block 515 to calculate the on-time setting value, and the period setting value for the second stage PWM signal is determined with the mass flow rate command in a block 516.

Figure 5C:
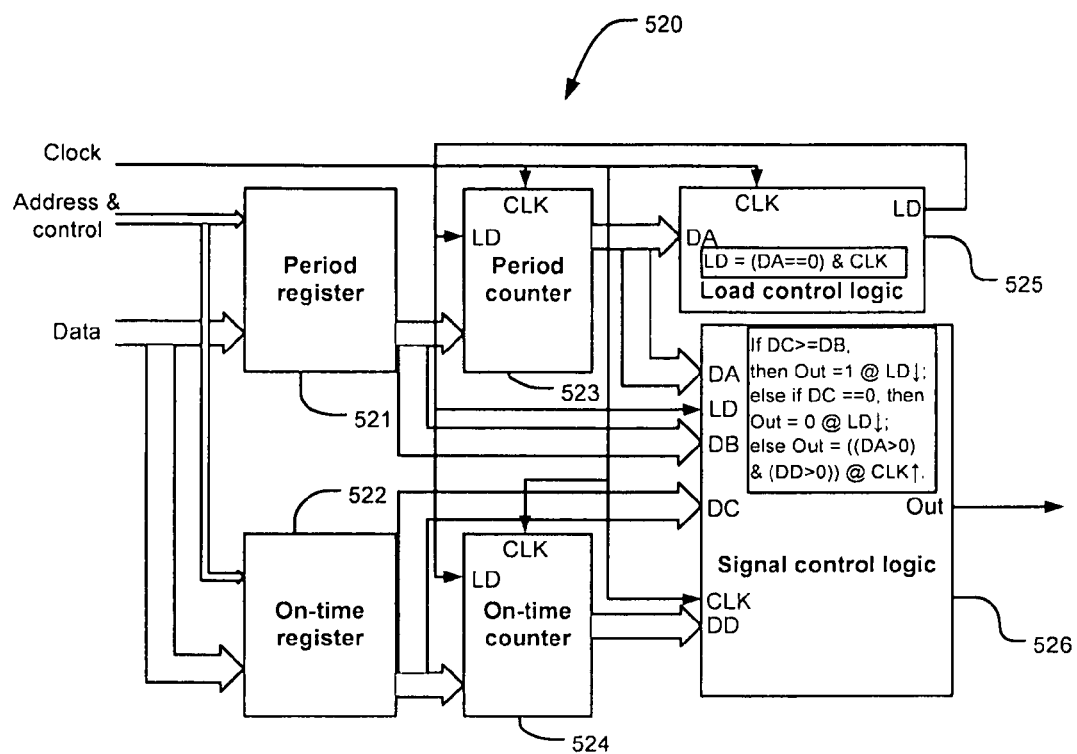
FIG. 5c is a block diagram with signal flow chart of a PWM signal generation circuit.

A variety of circuits can be used in the PWM signal generator 520 to generate a PWM signal. The block diagram and signal flow chart of an exemplary circuit is shown in FIG. 5c. In this circuit, period and on-time values of a PWM signal are set to a period register 521 and an on-time register 522 respectively. Upon the falling edge of a LD signal, the values in the period register 521 and the on-time register 522 are further, respectively, loaded in a period counter 523 and an on-time counter 524. Both of the period counter 523 and the on-time counter 524 are counting down counters and a clock signal synchronizes their counting actions. When the period counter 523 counts to 0, in a load control logic 525, a LD pulse is generated with the clock signal, and a new cycle starts at the falling edge of the LD pulse. The period counter value DA, the LD signal, the period register value DB, the clock signal, the on-time register value DC, and the on-time counter value DD are used in a signal control logic 526 for generating the PWM signal. In the signal control logic 526, if DC is equal or greater than DB, i.e., the on-time register setting value is equal or greater than the period register setting value, then a high level signal or 100% duty cycle PWM signal is generated upon a falling edge of the LD signal. When DC is set to 0, then a low level signal, i.e., 0% duty cycle PWM signal is generated at a falling edge of the LD signal. If DC is within 0 and DB, then at a rising edge of the clock signal, the PWM signal is determined by the values of the period counter and the on-time counter, DA and DB: the PWM signal is at high level only when both of the DA and DB are greater than 0.

Figure 5D:
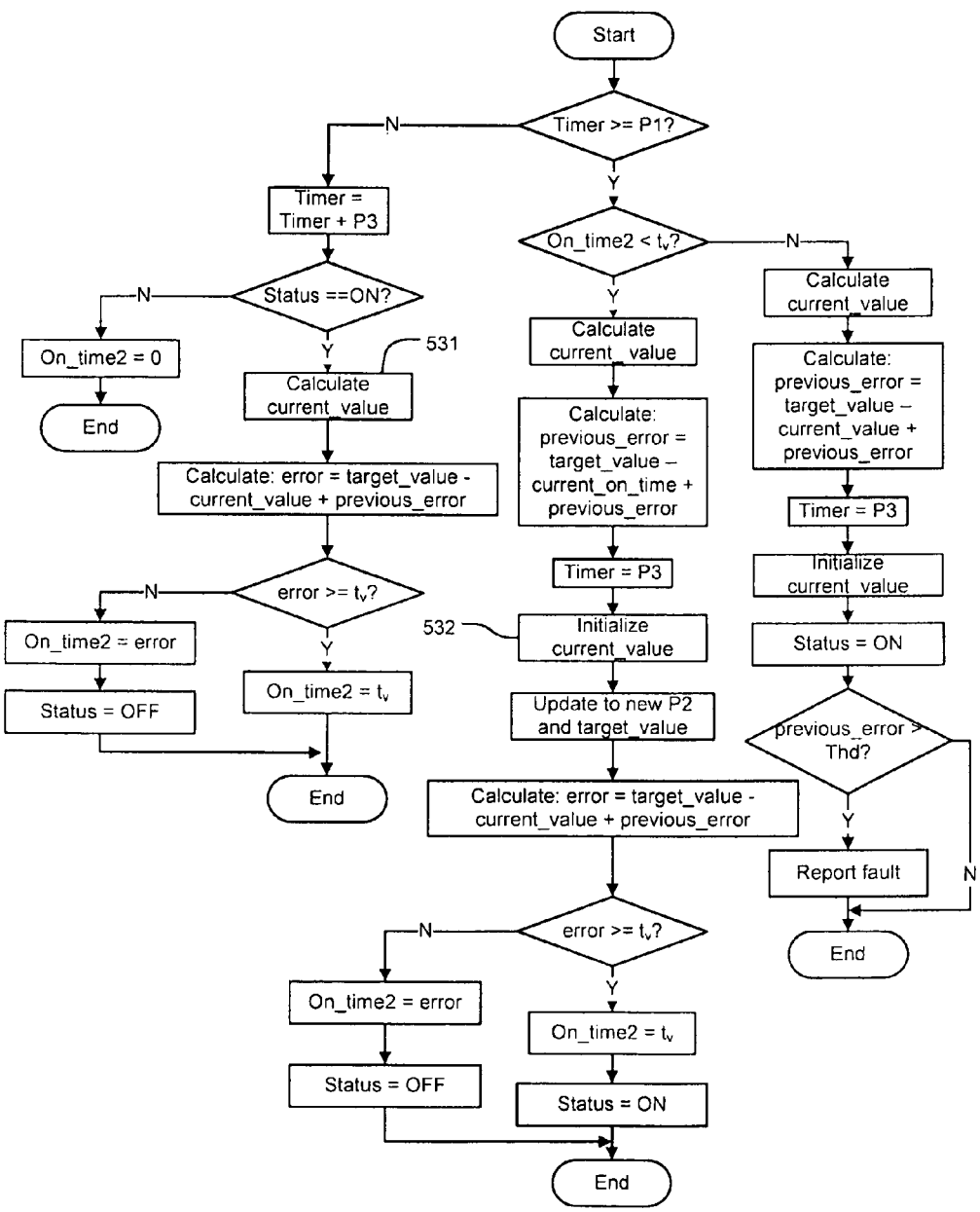
FIG. 5d is a flow chart of an interrupt service routine used in on-time and period determination control of FIG. 5b.

The PWM control block 510 can be realized with a service routine running periodically for a timer based interrupt. A flow chart of this interrupt service routine is shown in FIG. 5d. In the flow chart, $t_v$ and Thd are constant values; P1 is the period value of the first stage PWM signal, and P3 is the interrupt period value. Status is the PWM pulse status flag. When a constant on_time value of $t_v$ is set to the second PWM signal, Status value is ON, otherwise, it is OFF. The variable target_value contains the target on_time value for the first stage PWM signal, while the variable current_value saves the calculated on_time value of the first stage PWM signal at the current moment. P2 and On_time2 are, respectively, the period and on-time registers in the second stage PWM signal generation, and the variable Timer saves the current time in a first stage PWM cycle.

When the interrupt routine is triggered, the value of Timer is compared to the period value P1 of the first stage PWM signal. If the current cycle is finished, i.e., Timer>=P1, then the on_time value of the second stage PWM signal is examined. When the on_time value is lower than $t_v$, the total error of this PWM cycle, i.e., previoius_error, is calculated. And after the Timer value is reset to P3 and the current_value is initialized in a step 532, the register P2 and the variable target_value are updated for a new cycle, which starts with calculating the error to be corrected in the current cycle by adding the current error to the error in the previous cycle. If the error to be corrected is higher than $t_v$, then the on_time of the second PWM signal, On_time2, is set to $t_v$ and Status flag is set, otherwise, On_time2 is set to the error value and Status flag is reset. The routine ends thereafter. Referring back to the comparison between the On-time2 value and tv, if the On_time2 value not lower than $t_v$, then it means the error cannot be corrected in this PWM cycle. In this case, the error in the previous cycle is calculated and after the Timer is set to P3 and the current_value is initialized, Status flag is set. Since the error is not corrected, it is accumulated. When the accumulated error is higher than the threshold Thd, a fault is reported, and the routine ends. Referring back to the comparison between the Timer value and P1, when Timer value is lower than P1, i.e., in the current PWM cycle, the Timer value is incremented by P3, and then Status flag is examined. If Status flag is OFF, then the On_time2 is cleared to 0, and the routine ends, otherwise, current_value is calculated in a step 531 and the error is updated thereafter. Before the routine ends, the error value is compared to $t_v$. If the error value is equal or greater than $t_v$, then On_Time2 is set to $t_v$, otherwise, the error value is set to On_time2 and Status flag is reset to OFF. The routine ends thereafter.

Figure 5E:
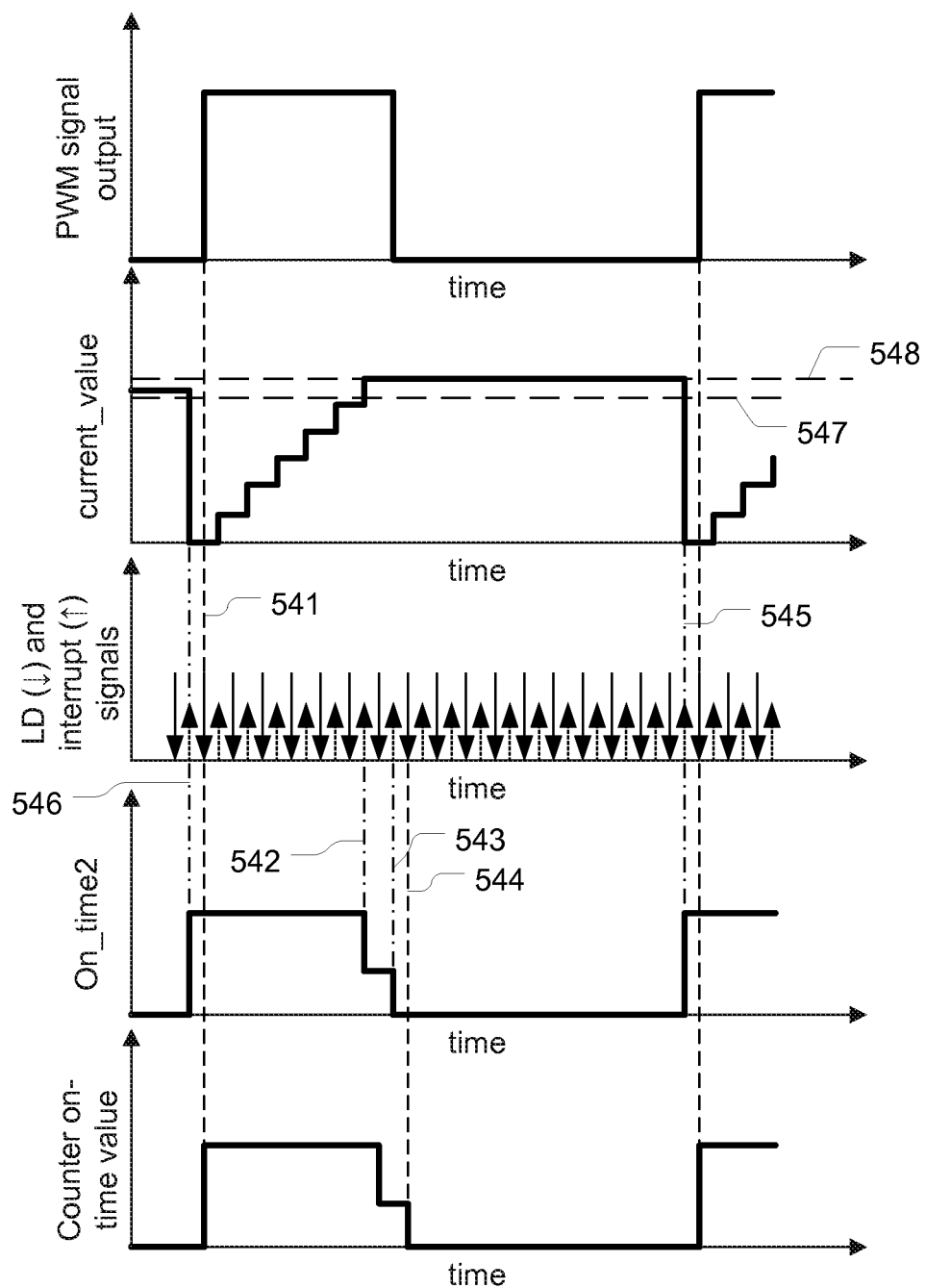
FIG. 5e is a timing chart of signals in a PWM signal generation using the interrupt service routine of FIG. 5d.

In the interrupt routine, normally $t_v$ is selected greater than the error to be corrected (e.g. $t_v$ equals the value of P2). And the interrupt period value (P3) can be the same as that of the second stage PWM signal (P2). With the interrupt routine of FIG. 5d, a signal timing chart when $t_v$ equals P3 and P2 is shown in FIG. 5e. An interrupt is triggered at a moment 546. Since the error, which is calculated by comparing the value of current_value and a target value 547, is higher than $t_v$, the On_time2 is set to $t_v$. Upon a falling edge of the LD signal, at a moment 541, the On_time2 value is loaded in the on-time counter (e.g. 524 in FIG. 5c) and a PWM pulse is triggered. The current_value accumulates with time. At a moment 542, when the calculated error is lower than $t_v$, the error value is assigned to On_time2. In the next interrupt triggered at a moment 543, On_time2 is set to 0 and the current_value variable is locked at a value 548. The on_time counter value thereafter is updated at falling edge of a LD signal at a moment 544, and the PWM pulse is complete. At a moment 545, the current PWM cycle ends, and the previous_error (FIG. 5d) is updated for the next cycle by including the error between the current_value value 548 and the target value 547.

In the interrupt routine of FIG. 5d, the target_value can be calculated with the reductant flow rate command using the following formula:

$$\text{target\_value}(i) = \text{Mass\_flow\_rate}_{cmd} * S_0 \quad (F1),$$

where Mass_flow_rate_cmd is the mass flow rate command to the PWM control, and $S_0$ is the period value of the first stage PWM signal. And the formula for caculating the current_value in the step 531 can be:

$$\text{current\_value}(i) = K * \text{sqrt}(Pr(i) - Pc) * P3 + \text{current\_value}(i-1) \quad (F2),$$

where sqrt is the square root calculation, Pr(i) the pressure sensing value for the calculation in the i-th interrupt cycle, and Pc the pressure in the exhaust passage 166; K is the term $C_D' A_n' \sqrt{2\rho'}$ in equation (2), and i is the number of interrupts after Timer is reset:

$$i = \text{Timer}/P3 \quad (F3);$$

current_value(0) is set to 0 in the step 532.

Figure 6:
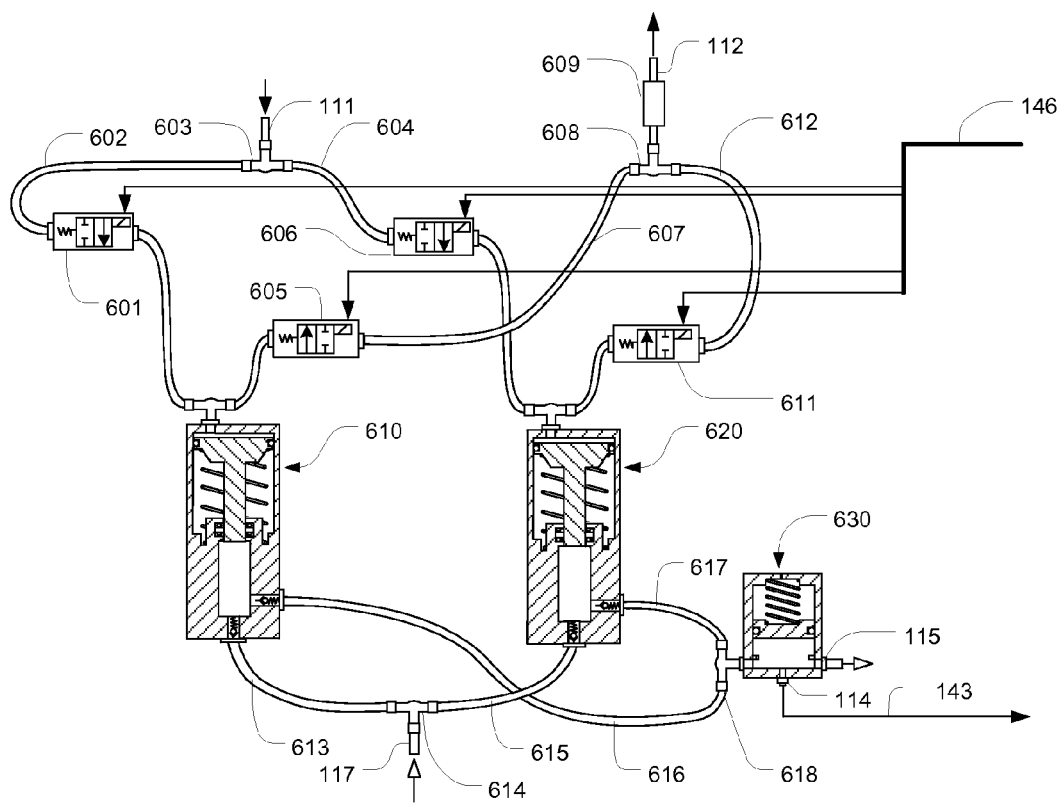
FIG. 6 shows a reductant pumping system with two air driven hydraulic pumps.

The hydraulic buffer pressure in the pumping system is controlled constant during pressing stroke. However, in a suction stroke, the pressure varies since the closed-loop pressure control has to be disabled. The two-stage PWM control is a method to accurately control reductant flow rate with the pressure variation. Another method is using a double pump system as shown in FIG. 6. Referring to FIG. 6, two pumps 610 and 620 and a hydraulic buffer 630 work together to provide a liquid flow with controlled pressure. A normally-closed air-intake solenoid 601 with its outlet fluidly connected to the pump 610 has its inlet fluidly connected to a side port of a T connector 603, through an air passage 602. The other side port of the T connector 603 is fluidly connected to the inlet of another normally-closed air-intake solenoid 606, the outlet of which is fluidly connected to the pump 620. The center port of the T connector 603 is fluidly connected to a compressed air supply. In the same way, the normally-open air-releasing solenoids 605 and 611 of the pumps 610 and 620 are fluidly connect together through a T connector 608, the center port of which can be fluidly connected to a muffler 609 to decrease air releasing noise. In the reductant delivery path, a passage 613 fluidly connects the reductant supply port of the pump 610 to a side port of a T connector 614, the other side port of which is fluidly connected to the reductant supply port of the pump 620 through a passage 615. The center port of the T connector 614 is fluidly connected to a reductant supply through the port 117. In the same way, the reductant output ports of the pump 610 and 620 are fluidly connected to the two side ports of a T connector 618 separately through passages 616 and 617. The center port of the T connector 618 is fluidly connected to the reductant supply port of a hydraulic buffer 630. A pressure sensor 619 positioned inside the hydraulic buffer 630 is electrically connected to the DCU 140 through the port 114 and the line 143, and the DCU 140 also electrically controls the solenoid valves 601, 605, 606, and 611 through the control lines 146. The two pumps 610 and 620 can work alternately to avoid a period of time losing closed-loop pressure control.

Dosing Control

Figure 7A:
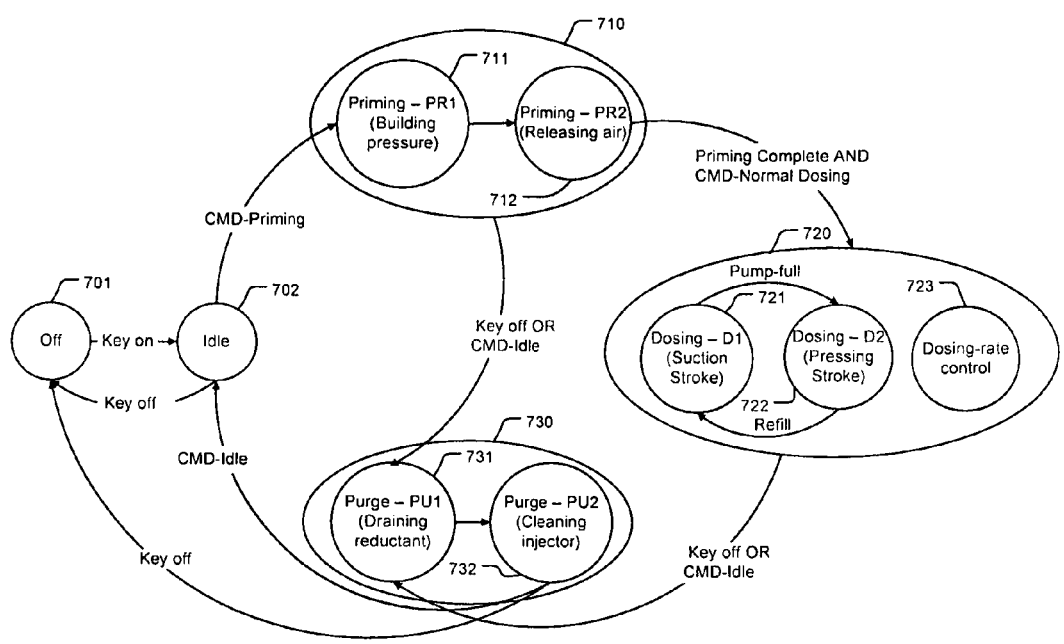
FIG. 7a is a state flow diagram of a reductant delivery control.

The dosing control is to deliver reductant into an exhaust gas treatment system. Referring to FIG. 7a, with the pumping system of FIG. 1, the overall dosing control has five main states: an Off state 701, an Idle state 702, a Priming state 710, a Dosing state 720, and a Purge state 730. In the Off state 701, the pump control is in Mode 0, and the injector 130 and the return line shutoff valve 137 are de-energized, while in the idle state 702, with the injector 130 and the shutoff valve 137 still being off, the pump control goes to Mode 1, in which air inside the pump body is blocked from ambient.

Figure 7B:
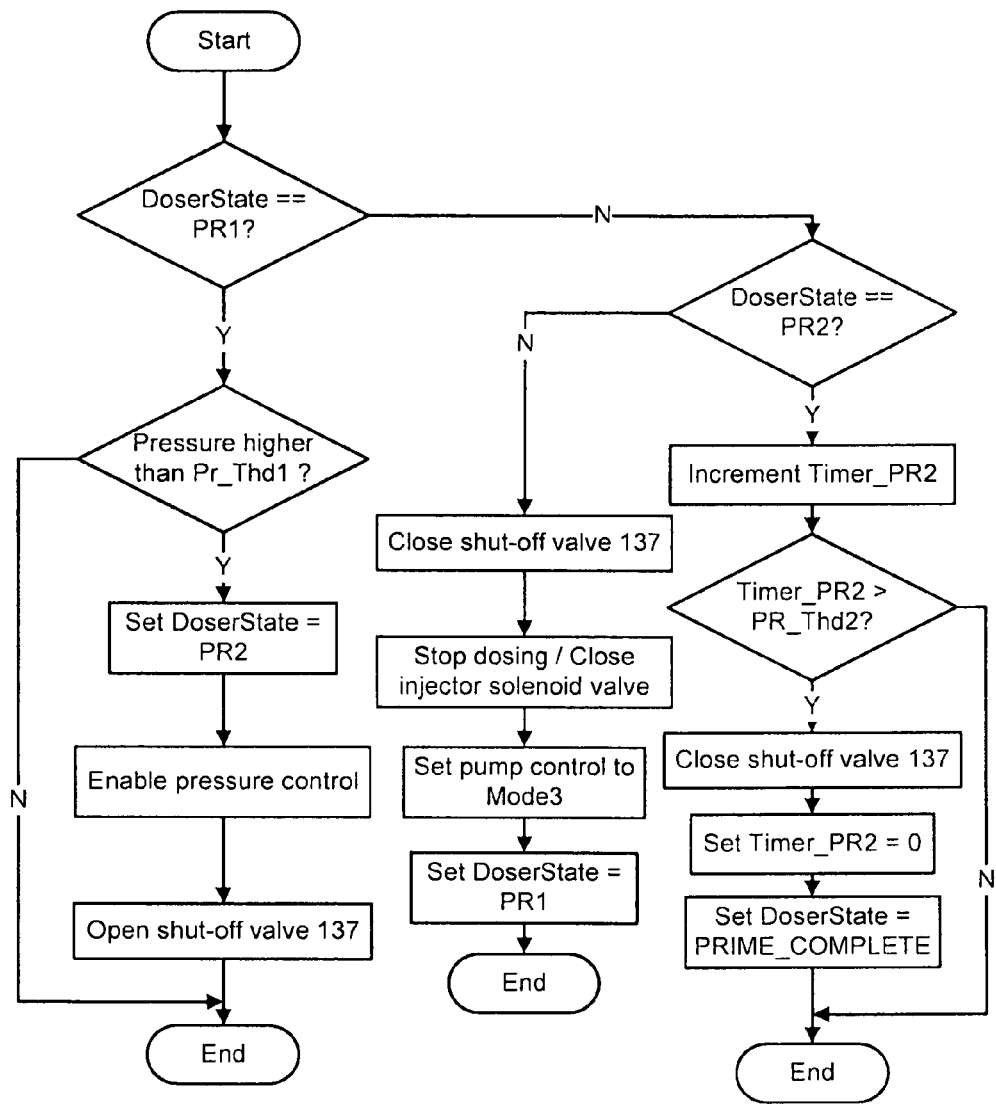
FIG. 7b is a flow chart of an interrupt service routine for priming control.

In the priming states, there are two sub-states: a PR1 state in which reductant pressure is established, and a PR2 state for releasing air trapped in reductant lines and the injector. An embodiment of the priming control is an interrupt service routine with its flowchart shown in FIG. 7b. This service routine runs periodically for a timer based interrupt. When the service routine starts, once the priming control is enabled, the DoserState is examined. If it is neither of PR1 nor PR2, then the shut-off valve and injector are de-energized first and then the pump control is set to Mode 3, with which compressed air flows into the pump body. Then the DoserState is set to PR1 and the routine ends thereafter. When the routine is called next time, the DoserState becomes PR1, then the routine examines the pressure in the hydraulic buffer, if it is lower than or equal to a threshold Pr_Thd, then the routine ends, otherwise, the DoserState is set to PR2, and the pump pressure control as shown in FIG. 2c is enabled to keep the pump pressure constant. Before the routine ends, the shut-off valve 137 is energized to release trapped air back to the tank. When the routine is called with DoserState being set to PR2, then a timer Timer_PR2 is used to control the opening time of the shut-off valve 137. When the timer value is higher than a threshold PR_Thd2, with the timer value being reset, the shut-off valve 137 is de-energized and the DoserState is set to PRIME_COMPLETE. The routine ends thereafter.

Referring back to FIG. 7a, in the dosing state 720, in addition to pump control, which includes two states: a suction stroke state 721 and a pressing stroke state 722, there is another control, dosing-rate control 703, running in parallel. A stroke control interrupt routine shown in FIG. 2b with pressure control routine shown in FIG. 2c can be used for the pump control. And a two-stage PWM dosing control routine of FIG. 5d can be used for the dosing-rate control.

Figure 7C:
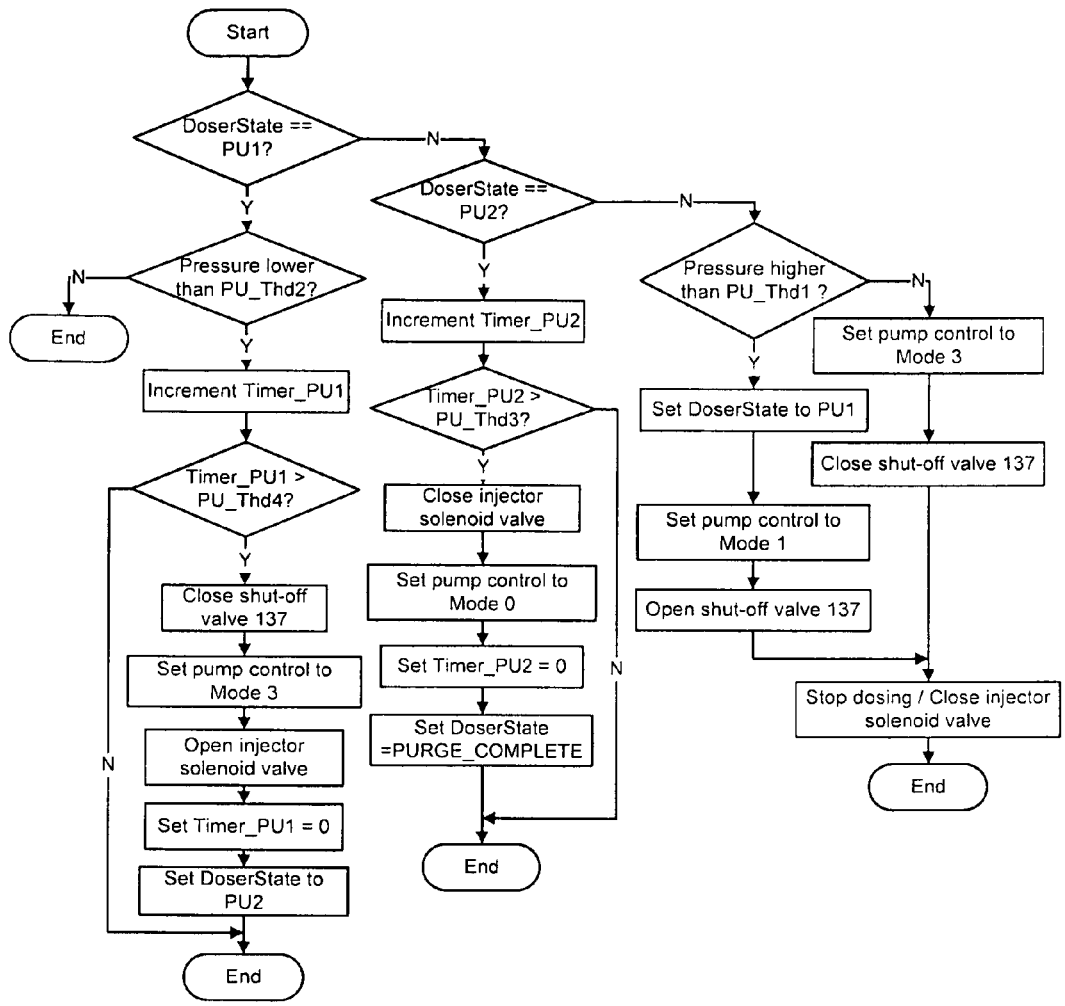
FIG. 7c is a flow chart of an interrupt service routine for purging control.

The purge control state also includes two sub-states: a PU1 state 731, in which reductant is drained from the pump, hydraulic buffer, and lines to the tank, and a PU2 state 732, in which reductant residue inside the injector that is not drained in PU1 is blown out. A service routine running periodically for a timer based interrupt as shown in FIG. 7c can be used for the purge control. In this routine, when a purge control is enabled, the DoserState is first examined. If it is neither PU1 nor PU2, then the hydraulic pressure is compared to a threshold value PU_Thd1. If the pressure is higher than the threshold, then with DoserState being set to PU1, the pump control is set to Mode 1, with which the air in the pump body is blocked from both of the compressed air supply and ambient, and the shut-off valve 137 is energized, otherwise, the pump control is set to Mode 3, and the shut-off valve 137 is de-energized to build up pressure. The injector 130 is de-energized, and the routine ends thereafter. When the routine starts with the DoserState being set to PU1, then the hydraulic buffer pressure is examined. If the pressure is higher than or equal to a threshold value PU_Thd2, then the routine ends, otherwise, a timer Timer_PU1 is used to control the open time of the shut-off valve 137. If the open time is longer than a threshold PU_Thd4, then with the timer being reset, the shut-off valve 137 is de-energized. The pump control is set to Mode 3 thereafter, and the injector 130 is energized to blow the reductant residue out. The routine ends after he DoserState is set to PU2. When the routine is called with DoserState being set to PU2, a timer Timer_PU2 is used to control the injector open time. If the injector open time is longer than a threshold PU_Thd3, then the injector is de-energized, and the pump control is set to Mode 0, in which air in the pump body is released. The timer is reset thereafter, and the routine ends after the DoserState is set to PURGE_COMPLETE.

Referring back to FIG. 7a, the dosing control states change with either engine key status or the commands received from an upper level controller, which determines dosing control strategies. The dosing control enters the Idle state 702 from the Off state upon a key-on signal. If a priming command CMD-Priming is received, the dosing control then starts priming, otherwise upon a key-off signal, the dosing control returns back to the Off state. After the priming completes, if a command CMD-Normal Dosing is received, then the dosing control enters the dosing state 720, in which pressure control, stroke control, and dosing-rate control are enabled. In the priming state 710 and the dosing state 720, anytime when a key-off signal or a command CMD-idle is received, the pumping control will enter the purge state 730 to clean reductant residue in the pump, hydraulic buffer, lines, and the injector. After the purge is completed, if there is a command CMD-idle, then the dosing control goes into the idle state, otherwise, upon a key-off signal, the dosing control goes into the Off state.

In addition to dosing control, the dosing system also needs to heat the reductant under low ambient temperature conditions to keep it from being frozen. As mentioned above, in a dosing system of FIG. 4, when the pump is positioned in the tank, the system only needs to control the temperature of the reductant tank and the passage line (e.g. the line 131 in FIG. 1) from being below reductant freezing point. In the tank temperature control, with the temperature sensor (e.g. temperature 404 in FIG. 4) in the tank, a simple feedback control, such as a relay control, can be used for heating the reductant, while in the passage line heating control, since reductant thawing is not required, only a small current needs to be applied to the heater (e.g. the line heater 132 in FIG. 1) to keep the line temperature above freezing point during dosing. If the pump is positioned outside the tank, then in addition to the tank temperature control and heating control for the passage line, extra heating controls are needed for controlling the pump temperature (e.g. controlling the pump temperature using the heater 113 in FIG. 1) and supply line temperature (e.g. heating the supply line 123 with the heater 124 in FIG. 1). Normally the heating for the return line (e.g. the line 125 in FIG. 1) is not necessary. However, if the return line is positioned lower than the reductant tank, then there could be reductant residue in the return line, and an extra heater (e.g. the heater 117 in FIG. 1) is needed for keeping the temperature in the return line from being too low.

Compressed Air Supply

Figure 8:
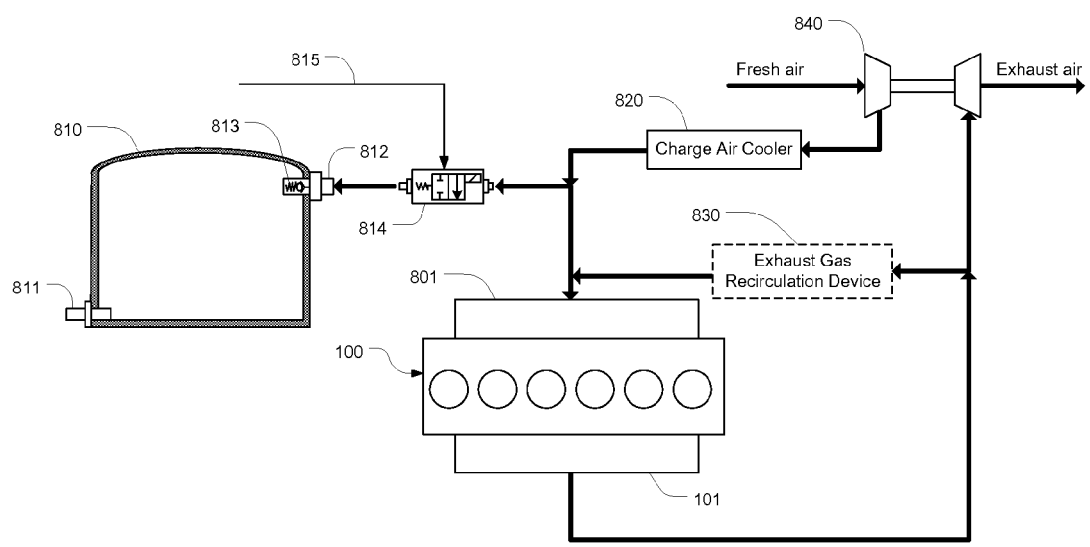
FIG. 8 is shows an hydraulic pump using compressed air provided by an engine turbo.

The closed loop control of the hydraulic buffer pressure and the two-stage PWM dosing control make the dosing rate insensitive to variations in the compressed air supply, and the use of pressure boosting pump as shown in FIG. 3a and FIG. 3b allows low pressure compressed air supply. Thereby a variety of compressed air sources can be used for the dosing system in the present invention. A convenient compressed air source in a diesel engine is compressed intake air generated from a turbo. As shown in FIG. 8, the exhaust gas produced by the engine 100 goes into a turbo 840 from the exhaust manifold 101. In the compressor of the turbo, fresh air is compressed and the result airflow exchanges heat energy with coolant in a Charge Air Cooler (CAC) 820 to lower down its temperature. The compressed fresh air goes into an intake manifold of the engine directly for applications without Exhaust Gas Recirculation (EGR) devices. For applications using EGR (high pressure EGR), exhaust gas is branched to an EGR device 830 before it goes into the turbo 840. The exhaust gas regulated through the EGR device 830 then mixes with the compressed fresh air, and the result charge flow goes into the intake manifold 801. The low temperature compressed air (normally lower than 50° C.) coming from the CAC can be used as an air source for the dosing system. Referring to FIG. 8, an air tank 810 is used as a buffer to provide compressed air to the dosing system though a port

811. An inlet port 812 is connected to the compressed air through a check valve 813 and a solenoid valve 814 controlled by the DCU 140 (FIG. 1) through control lines 815. The shut-off valve is used to control the air flow provided to the air tank. When the engine control allows fresh air be taken from the charge flow, the DCU energizes the solenoid 814. The compressed air then flows into the air tank 810 if its pressure is higher than that set by the check valve 813. The flow rate of the compressed air can be controlled by the DCU applying a PWM signal to the solenoid 814.

In the present invention, though the compressed air can also be used in mixing with reductant to improve atomization as that in an air assisted dosing system, it is not necessary, since the reductant pressure is controlled constant. Due to nature of air driven hydraulic pumps, which are then the only component consuming compressed air in the dosing system of the present invention, compared to an air assisted dosing system, the air consumption is low: it is the same as the reductant consumption and normally is lower than 7 L/hour (10 bar) in most applications. The low air consumption is also an enabler to use compressed fresh intake air of the engine as air source, since the compressed air needed in the dosing system is only a small fraction of the engine intake air.

While the present invention has been depicted and described with reference to only a limited number of particular preferred embodiments, as will be understood by those of skill in the art, changes, modifications, and equivalents in form and function may be made to the invention without departing from the essential characteristics thereof. Accordingly, the invention is intended to be only limited by the spirit and scope as defined in the appended claims, giving full cognizance to equivalents in all respects.

What is claimed:

1. An apparatus for delivering reductants into an exhaust gas system of an internal combustion engine comprising:
   a reductant tank;
   a compressed air source;
   an air driven hydraulic pump that has a first inlet port fluidly coupled to said reductant tank through a check valve, a second inlet port fluidly coupled to said compressed air source, a first outlet port for releasing compressed air from said air driven hydraulic pump, and a second outlet port for reductant inside said air driven hydraulic pump to flow out;
   an injector for controlling a reductant flow rate to said exhaust gas system;
   a controller configured to control a reductant pressure by controlling air flow fed from said compressed air source to said air driven hydraulic pump through said second inlet port, and air flow released through said first outlet port, and configured to control a reductant dosing amount to said exhaust gas system by adjusting an opening time of said injector.

2. The apparatus of claim 1, further comprising:
   a hydraulic buffer with an inlet port fluidly coupled to said second outlet port of said air driven hydraulic pump through a check valve and an outlet port fluidly coupled to said injector.

3. The apparatus of claim 2, wherein a volume changing means is positioned inside said hydraulic buffer, and said volume changing means changes volume with a pressure of a reductant inside said hydraulic buffer.

4. The apparatus of claim 1, further comprising:
   a fluid passage fluidly coupling said injector to said reductant tank and a control valve controlling fluid flow in said fluid passage.

5. The apparatus of claim 4, wherein said controller is further configured to drain reductant in said air driven hydraulic pump by opening said control valve.

6. The apparatus of claim 1, wherein said air driven hydraulic pump is positioned inside said reductant tank.

7. The apparatus of claim 1, wherein said compressed air source includes a turbo of said internal combustion engine.

8. The apparatus of claim 1, wherein said air driven hydraulic pump further comprises:
   a piston moving up and down inside said air driven hydraulic pump, separating its inner space into an upper space fluidly connected to said first outlet port and said second inlet port, and a bottom space fluidly connected to said first inlet port and said second outlet port; and
   a fluid passage that fluidly couples said upper space to said bottom space through a check valve when said piston moves to a certain position.

9. The apparatus of claim 8, wherein said piston further creates a middle space in said inner space of said air driven hydraulic pump, and said middle space is fluidly connected to ambient.

10. The apparatus of claim 8, wherein said piston further creates a middle space in said inner space of said air driven hydraulic pump, and said middle space is fluidly connected to ambient except when said piston is at said certain position.

11. The apparatus of claim 1, further comprising:
    an alternate air driven hydraulic pump that has a first inlet port fluidly coupled to said reductant tank through a check valve, a second inlet port fluidly coupled to said compressed air source, a first outlet port for releasing compressed air from said alternate air driven hydraulic pump, and a second outlet port for reductant inside said alternate air driven hydraulic pump to flow out.

12. The apparatus of claim 11, wherein said controller is further configured to control said alternate air driven hydraulic pump switching between a suction stroke and a pressing stroke alternately with said air driven hydraulic pump to provide a constant reductant pressure.

13. The apparatus of claim 1, further comprising:
    a Venturi device with its high pressure inlet fluidly coupled to said compressed air source, its low pressure inlet fluidly connected to said second inlet port and said first outlet port, and its outlet fluidly coupled to ambient.

14. A method for controlling a fluid dosing system including a fluid tank, a first pump with a first-pump suction stroke and a first-pump pressing stroke, a second pump with a second-pump suction stroke and a second-pump pressing stroke, a hydraulic buffer, a pressure sensor provide a sensing value indicative of a fluid pressure in said hydraulic buffer, and an injector, comprising:
    building up fluid pressure in said hydraulic buffer in said first-pump pressing stroke of said first pump;
    enabling a feedback control to maintain said fluid pressure within a predetermined range in said first-pump pressing stroke of said first pump with at least said sensing value obtained from said pressure sensor, and starting said second-pump suction stroke of said second pump thereafter;
    enabling a feedback control to maintain said fluid pressure within said predetermined range in said second-pump pressing stroke of said second pump with at least said sensing value obtained from said pressure sensor, and starting said first-pump suction stroke of said first pump thereafter; and
    controlling a fluid delivery amount by adjusting an opening time of said injector.

15. A method for controlling a fluid delivery system including a fluid tank, a pump with a suction stroke and a pressing stroke, a hydraulic buffer, a pressure sensor providing a sensing value indicative of a fluid pressure in said hydraulic buffer, and an injector opened and closed with a valve operated by a solenoid, comprising:
   building up fluid pressure in said hydraulic buffer in said pressing stroke of said pump;
   enabling a feedback pressure control in each of said pressuring stroke of said pump to maintain a fluid pressure within a predetermined range in said hydraulic buffer by adjusting an air amount in said pump through feeding compressed air into said pump, keeping air in said pump, and releasing air from said pump, according to said sensing value obtained from said pressure sensor;
   disabling said feedback pressure control in each of said suction stroke of said pump; and
   controlling a fluid delivery amount by energizing said solenoid for a period of time.

16. The method of claim 15, further comprising:
   draining fluid residue in said hydraulic buffer back to said fluid tank; and
   purging fluid residue in said injector.

17. The method of claim 15, further comprising:
   controlling a fluid delivery rate by using a pulse-width modulation method, with which said fluid delivery amount is controlled in a repeating control cycle according to said sensing value obtained from said pressure sensor.

18. The method of claim 17, wherein said pulse-width modulation method includes a two stage control, in which a first stage control generates a first stage PWM signal by periodically commanding a second stage control, which generates a second stage signal, according to at least said sensing value obtained from said pressure sensor.

* * * * *